(12) United States Patent
Murray

(10) Patent No.: US 9,109,799 B1
(45) Date of Patent: *Aug. 18, 2015

(54) METHOD FOR INITIATING FLOW OF FLUID BLOCKED BY FROZEN FLUID

(76) Inventor: William M Murray, Enola, PA (US)

( * ) Notice: Subject to any disclaimer, the term of this patent is extended or adjusted under 35 U.S.C. 154(b) by 732 days.

This patent is subject to a terminal disclaimer.

(21) Appl. No.: 13/405,978

(22) Filed: Feb. 27, 2012

Related U.S. Application Data

(60) Division of application No. 13/315,508, filed on Dec. 9, 2011, which is a continuation-in-part of application No. 12/779,447, filed on May 13, 2010, now Pat. No. 8,109,264.

(51) Int. Cl.
*F23J 3/02* (2006.01)
*F25B 13/00* (2006.01)

(52) U.S. Cl.
CPC ......................................... *F23J 3/02* (2013.01)

(58) Field of Classification Search
CPC .................................. F23J 3/02; F23B 13/00
USPC ......... 126/636, 420, 434, 437; 165/48.2, 107; 251/71
See application file for complete search history.

(56) References Cited

U.S. PATENT DOCUMENTS

| | | | |
|---|---|---|---|
| 2,202,756 A | 5/1940 | Cline | |
| 2,444,241 A * | 6/1948 | Belter et al. | ................. 426/564 |
| 2,716,179 A | 8/1955 | Cornelia | |
| 2,877,630 A | 3/1959 | Schultz | |
| 3,900,047 A | 8/1975 | Heppell | |
| 4,074,406 A | 2/1978 | Boyd et al. | |
| 4,083,093 A | 4/1978 | Chertok | |
| 4,133,338 A | 1/1979 | Honikman | |
| 4,142,514 A | 3/1979 | Newton | |
| 4,191,166 A * | 3/1980 | Saarem et al. | ................ 126/585 |
| 4,202,320 A | 5/1980 | Bowen | |
| 4,207,866 A * | 6/1980 | Boyd | ............................ 126/588 |
| 4,248,258 A | 2/1981 | Devitt et al. | |
| 4,286,580 A | 9/1981 | Sitnam | |
| 4,308,856 A | 1/1982 | Durand et al. | |
| 4,309,987 A | 1/1982 | Higgins | |
| 4,423,311 A | 12/1983 | Varney, Sr. | |
| 4,474,172 A | 10/1984 | Burke | |
| 5,142,882 A | 9/1992 | Vandenberg | |
| 5,143,053 A | 9/1992 | Baer | |
| 6,727,481 B1 | 4/2004 | Wilds | |
| 7,721,766 B2 | 5/2010 | Sawada | |
| 8,028,721 B2 | 10/2011 | Koskey, Jr. | |
| 2007/0251226 A1 | 11/2007 | Kaneko | |
| 2009/0242062 A1 | 10/2009 | Sawada | |

FOREIGN PATENT DOCUMENTS

| | | |
|---|---|---|
| CN | 101245942 A | 8/2008 |
| DE | 19505857 A1 | 8/1996 |
| JP | 58028953 A | 2/1983 |
| JP | 9079664 | 3/1997 |
| JP | 10009673 A | 1/1998 |

* cited by examiner

*Primary Examiner* — Gregory Huson
*Assistant Examiner* — Nikhil Mashruwala
(74) *Attorney, Agent, or Firm* — Hooker & Habib, P.C.

(57) ABSTRACT

A method for automatically initiating the flow of fluid in a pipe that may be blocked by frozen fluid in a portion of the pipe includes urging the flow of fluid through the pipe and energizing a heater disposed in and extending the pipe portion if no flow is detected in the pipe.

22 Claims, 8 Drawing Sheets

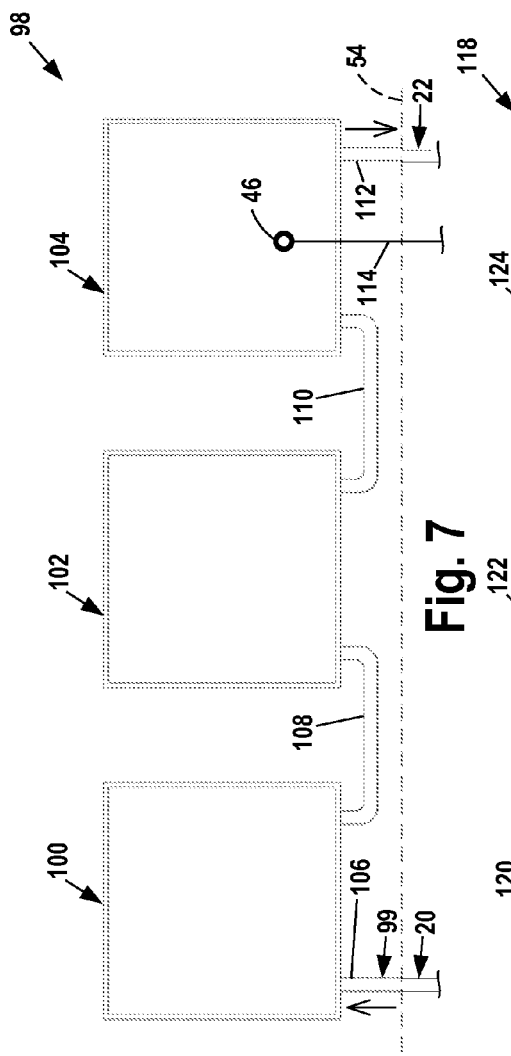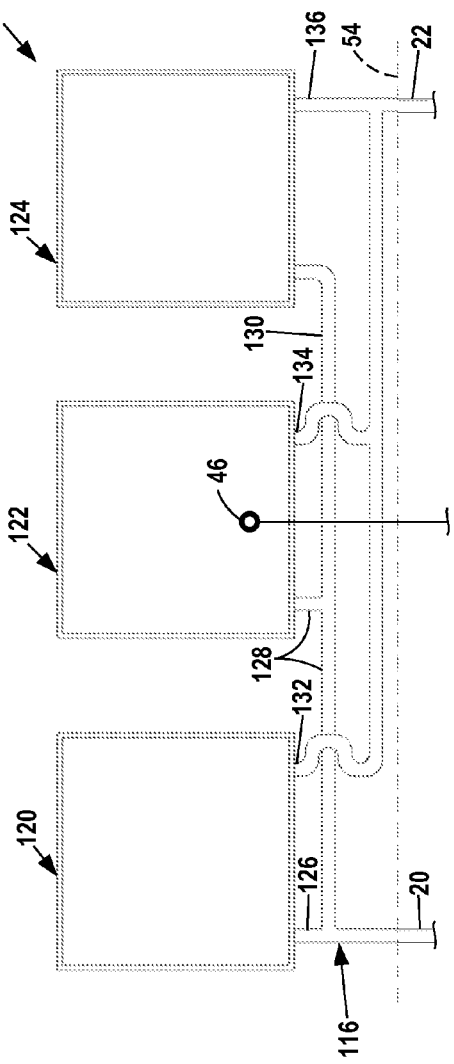

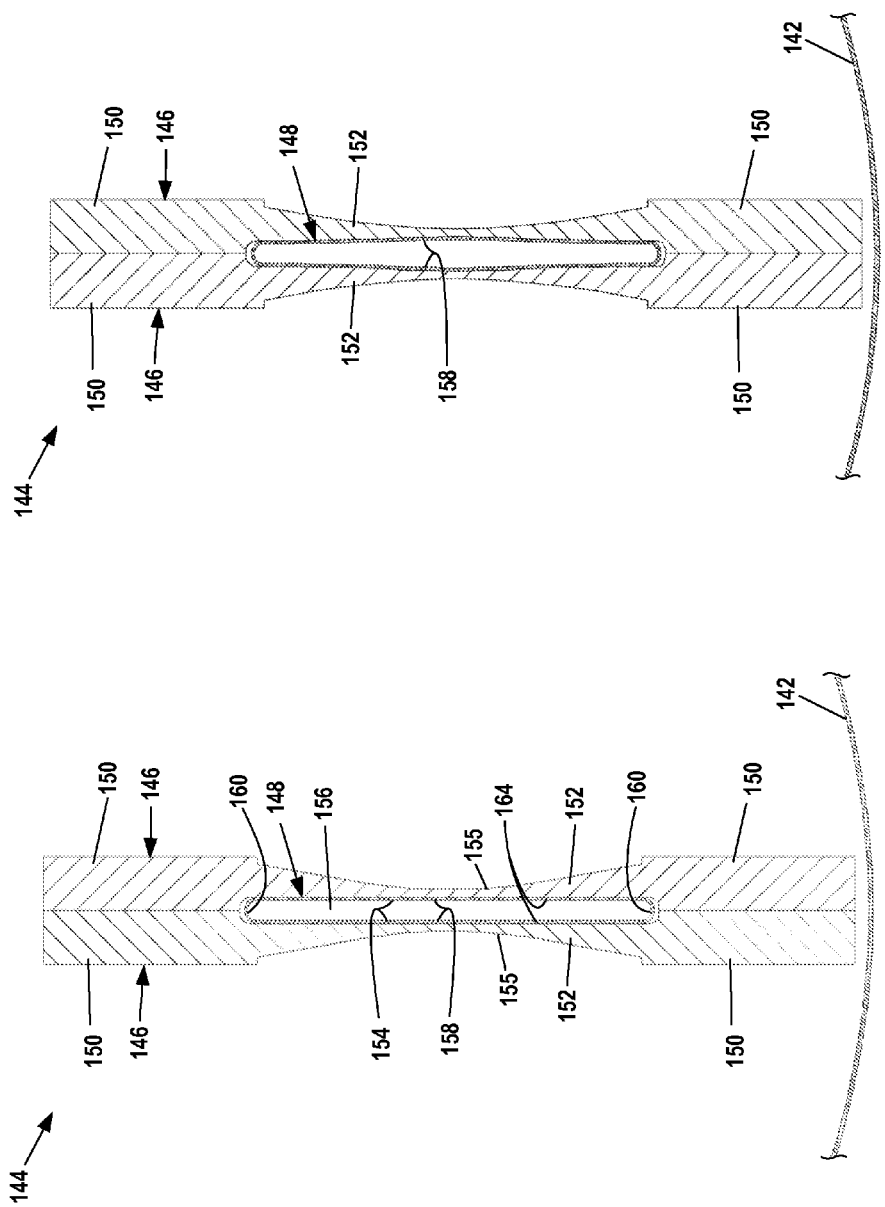

METHOD FOR INITIATING FLOW OF FLUID BLOCKED BY FROZEN FLUID

FIELD OF THE DISCLOSURE

The disclosure relates to a method for automatically initiating the flow of fluid through a pipe or the like in which a portion of the pipe may be exposed to freezing temperatures such that fluid flow through the pipe may potentially be blocked by frozen fluid in the pipe, and particularly, to a method for initiating the flow of water through a solar hot water heating system.

BACKGROUND OF THE DISCLOSURE

Fluid systems that urge a fluid to flow from one location to another are well known. The fluid in some fluid system applications may flow through an area exposed to freezing temperatures that may cause the fluid to freeze and block fluid flow. For example, solar water heating systems utilize a pump that urges water to flow through supply pipes extending between a solar heating assembly that heats the water by solar energy and a hot water tank that stores the heated water. The supply and return pipes, however, may be exposed to outdoor temperatures below freezing that cause the water in the supply pipes to freeze and prevent operation of the heating system.

Some users of solar water heating systems manually monitor the system for water freezing in the supply pipes and turn on heaters wrapped around the pipes as needed to melt the ice blocking the pipes, and then turn off the heaters well after the blockage is cleared. Requiring manual intervention and supervision of the hot water heating system is often impractical, particularly in residential applications where the homeowner may be away. Energy is wasted if the heaters are kept on longer than necessary.

Some conventional solar water heating systems avoid the problem of water freezing in the supply lines by draining the water from the pipes when freezing may occur. This increases system complexity and prevents use of the system during cold months. Other conventional solar heating systems replace water with another fluid, such as ethylene glycol, that does not freeze when exposed to outdoor temperatures. This solution is less energy efficient and is considerably more complicated and expensive than solar heating systems that use water as a heat transfer medium.

Accordingly, there is a need for an improved method for automatically initiating the flow of fluid through a pipe or the like in which a portion of the pipe may be exposed to freezing temperatures such that fluid flow through the pipe may potentially be blocked by frozen fluid in the pipe. The method should be relatively inexpensive to implement, not require manual intervention, and be relatively energy-efficient in clearing the blockage. The improved method should be useable with solar hot water heating systems.

SUMMARY OF THE DISCLOSURE

The disclosure is an improved method for automatically initiating the flow of fluid through a pipe or the like in which a portion of the pipe may be exposed to freezing temperatures such that fluid flow through the pipe may potentially be blocked by frozen fluid in the pipe. The method is relatively inexpensive to implement, does not require manual intervention, and is relatively energy-efficient in clearing the blockage. The improved method can be applied to solar hot water heating systems.

A method for initiating the flow of fluid through a pipe in which a portion of the pipe may be exposed to freezing temperatures such that fluid flow through the pipe may potentially be blocked by frozen fluid in the pipe portion in accordance with the present disclosure includes the steps of:
  (a) urging the flow of fluid through the pipe; and
  (b) while urging the flow of fluid through the pipe, performing the following steps:
  (c) detecting the absence or presence of fluid flow through the pipe;
  (d) if no fluid flow is detected, heating a heater disposed in the pipe portion and extending the length of the pipe portion, thereby transferring heat from the heater to any frozen fluid blocking the pipe portion sufficient to initiate melting of a flow passage through the blockage;
  (e) detecting the absence or presence of fluid flow through the pipe while the heater is transferring heat; and
  (f) when fluid flow through the pipe is detected, stopping the heating of the heater.

The fluid flow detected may be slight at first. It is not necessary for the heater to melt all the frozen fluid, only enough to initiate flow—thereby reducing the energy expended to initiate flow. The heater is disposed in the pipe and is thereby in direct contact with the frozen fluid, increasing the efficiency of heat transfer from the heater to the frozen fluid and further reducing the energy expended to initiate flow.

In a preferred embodiment of the method, the heater is operatively connected to a controller, the controller also being operatively connected to a pump that urges fluid flow through the pipe. If the controller energizes the pump but then receives a signal indicating no fluid flow (thereby indicating the pipe is blocked by frozen fluid) the controller energizes the heater to initiate melting of the blockage. Once the controller receives a signal indicating fluid flow, the heater is turned off.

In preferred embodiments of the method the heater is formed as a resistance heating a wire, and heating the heater is accomplished by passing an electric current through the wire. If there are multiple pipe portions exposed to freezing conditions, there may be a respective wire or wire portion in each pipe portion, and heating the heater is accomplished by passing an electric current through each of the wires. The wires are relatively inexpensive and easy to install, and in most practical applications of the disclosure would not substantially impede fluid flow.

In some possible embodiments of the disclosure, the step of determining whether there is fluid flow is accomplished using a flow sensor. In other possible embodiments of the disclosure, the step of determining whether there is fluid flow is accomplished by taking temperatures at two different locations, each temperature related to the temperature of the fluid at that location. The magnitude of the temperature difference indicates whether or not fluid is flowing through the pipe (depending on system construction, blockage may be indicated if the magnitude of the temperature difference is less than some difference; in other system constructions blockage may be indicated if the magnitude of the temperature difference is greater than some difference).

The method of the present disclosure may be used to initiate flow in a solar water heating system of the type having a solar collector assembly that heats water by solar energy and a pipe system supplying water to the solar collector assembly and discharging water from the solar collector assembly, the pipe system having one or more pipe portions that may be exposed to freezing temperatures whereby ice formed in a pipe portion from such exposure may block the flow of water through the pipe portion. The heater is preferably formed as a respective wire extending through each pipe portion as previously described.

DESCRIPTION OF THE DRAWINGS

FIG. 7 is a representational view of a third embodiment solar heating system;

FIG. 8 is a representational view of a fourth embodiment solar heating system;

FIG. 10 is a partially broken away transverse sectional view through the solar collector of FIG. 9 when the water in the water heating pipe is liquid; and FIG. 11 is a view like FIG. 10 when the water in the water heating pipe is frozen and has expanded.

DESCRIPTION OF THE PREFERRED EMBODIMENTS

Figure 1:
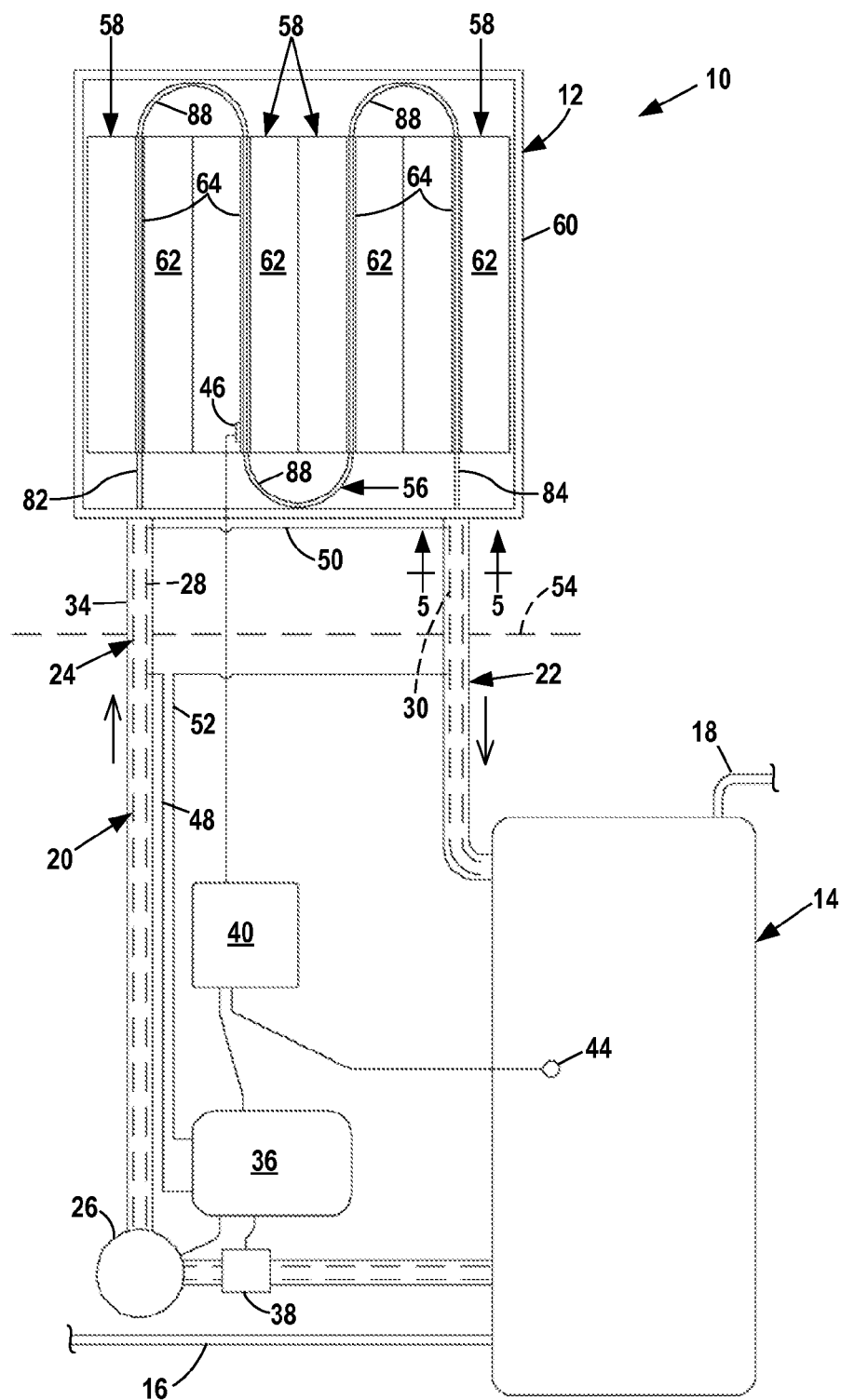
FIG. 1 is a representational view of a first embodiment solar heating system according to the disclosure.

The method of the present disclosure is illustrated and described with respect to a solar heating system shown in FIG. 1. System 10 includes a solar collector assembly 12, and a heated water storage tank 14. The system provides heated water for use in a building, typically a residential dwelling. The solar collector assembly 12 is mounted on the outside of the building and is positioned to receive solar energy. The tank 14 is located inside the building.

Cold water supply pipe 16 flows water to the bottom of tank from a water source. Heated water outflow pipe 18 flows heated water from the top of the tank for use in the building. Collector supply pipe 20 extends from the bottom of tank 14 to collector assembly 12. Collector return pipe 22 extends from the collector assembly to the top of the tank. Pipes 20 and 22 are formed preferably from PEX tubing. Circulator pump 26 located in pipe 20 flows water from the bottom of the tank through pipe 20, assembly 12 and pipe 22 back to the top of the tank. Water flowed through assembly 12 is heated by solar energy and heats the water in the tank. The portions 28 and 30 of pipes 20 and 22 outside of building wall 54 are connected to water heating pipe 56 running through collector assembly 12. Pipes 20, 56 and 22 form water conduit 24 extending from the tank 14, to assembly 12 and back to the tank.

Figure 5:
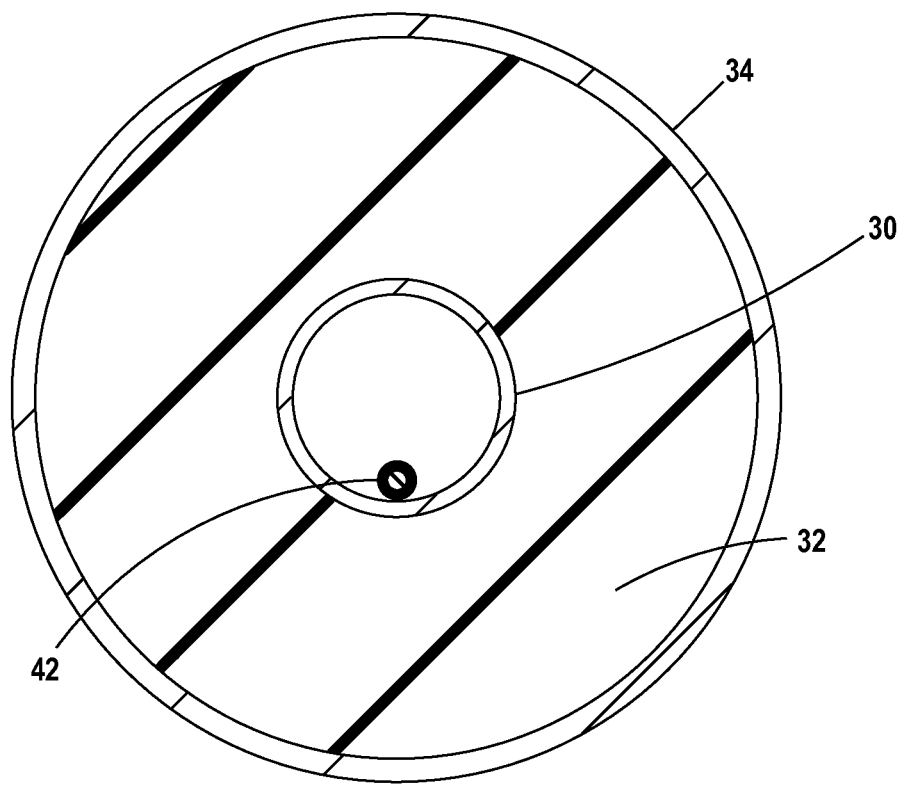
FIG. 5 is a sectional view along line 5--5 of FIG. 1.

Supply and return pipes 20 and 22 extend from tank 14 inside the building, through the exterior building wall 54 to collector assembly 12 mounted on the exterior of the building, typically on the roof of the building. The outdoor portions 28 and 30 of pipes 20 and 22 run from wall 54 to assembly 12. Portions 28 and 30 may extend from ground level up along a side of the building to assembly 12 mounted on the roof of the building. Pipes 20 and are surrounded by tubes of thermal insulation 32 and outer protective sheaths 34. See FIG. 5. The insulation 32 minimizes thermal losses in pipes 20 and 22 and prevents condensation. Pipes 20 and 22 are typically formed from PEX tubing which is not injured by freezing of water within it.

Electric control circuit 36 operates system 10. Circuit 36 is connected to flow sensor 38 located in collector supply pipe 20, and to differential thermostat 40. Circuit 36 activates and deactivates an electric resistance heating wire 42 located in each outdoor portion 28 and 30 of pipes 20 and 22.

Thermostat 40 includes temperature sensor 44 in tank 14 and temperature sensor 46 on water heating pipe 56 in collector assembly 12. Sensor 44 senses the temperature of the water in the tank. Sensor 46 senses the temperature of the water in pipe in the collector assembly. The differential thermostat 40 senses when the temperature at the heating pipe 56 exceeds the temperature of water in tank 14 by a predetermined amount using inputs from sensors 44 and 46, and when this condition exists it sends a signal to control circuit 36.

Power wire 48 extends from control circuit 36 through the wall of pipe 20 inside of building wall 54 and is connected to a resistance heating wire 42 in pipe portion 28 extending from wall 54 to housing 60.

Power wire 50 extends from the end of the resistance heating wire 42 in pipe 20 adjacent the housing 60, through the wall of the pipe, along the housing, through the wall of pipe 22 adjacent housing 60 and joins the end of a second resistance heating wire 42 in the outer end 30 of pipe 22. Wire 42 extends along the interior of pipe 22 through wall 54 and inside the building. Power wire 52 extends from the end of wire 42 through the wall of pipe 22 and to control circuit 36. When actuated, the two resistance heating wires 42 melt ice blockages in the exterior portions 28 and 30 of pipes 20 and 22 extending from wall 54 to collector assembly 12. Alternatively, the power wires 48 and 50 may be lengths of double conductor wires with the wires joined at ends of the power wires and with the two lengths extending through the pipes at single locations in the pipes.

Solar collector assembly 12 includes four solar collectors 58 mounted side-by-side in housing 60. A sheet transparent to solar energy overlies the top of the housing to provide thermal insulation and to prevent water and debris from entering the housing. If desired, solar collectors 144, disclosed in FIGS. 9-11, may be used in place of solar collectors 58.

Each solar collector 58 includes an elongate, semi-cylindrical mirror 62 and a vertical solar absorber 64 in the center of the mirror. Water heating pipe 56 extends along the center of the absorber 64 between a pair of like energy absorber plates 66.

The pipe 56 is elliptical in cross section and has a short axis 70 and a long axis 68. The pipe is preferably formed from thin walled, elastic metal which may be austenitic or Series 300 stainless steel. The pipe sidewall may be about 0.020 inches thick to permit elastic outward flexing of the sidewall of the pipe when water in the pipe freezes and increases in volume. The pipe short axis 70 is sufficiently less than its long axis 68 so that when water in the pipe freezes and expands about 9%, the increased volume of the ice in the pipe elastically expands the pipe but does not expand the pipe to a maximum, circular cross section. Expansion of the pipe does not permanently deform or crack the pipe. When ice in the pipe melts, the pipe elastically returns to its original shape.

Elliptical pipe 56 should have an axis ratio (length of long axis 68 divided by length of short axis 70) of 1.44 or greater to prevent freeze expansion of the pipe to a circular cross section. In practice, the pipe may have an axis ratio of at least 1.50 to limit flexing of the pipe when water freezes and to reduce the possibility of fatigue cracking.

Pipe 56 need not have an elliptical cross section. The pipe may have two opposed long sides joined by short ends, or other cross sectional shapes which permit outward elastic flexing of the pipe wall when water in the pipe freezes. Typical domestic water pressure of less than 100 psi does not significantly deform pipe 56.

Energy absorbing plates 66 are preferably formed from extrusions of high thermal conductivity metal, such as aluminum. Each plate includes a flat, two-sided absorber panel 72 extending away from pipe 56 in a direction along pipe long axis 68. A pair of opposed solar energy transfer arms 74 at the inner edge of panel 72 extend to either side of pipe 56. The arms 74 are connected to the panels 72 by beams 80. The concave inner surfaces 76 of arms 74 are semi-elliptical in shape and are in surface-to-surface heat transfer contact with the outer surface of pipe 56. See FIG. 4. A slot or slit 78 extends from arms into panel 72 to either side of beams 80 to permit elastic flexing of the beams and outward movement of arms 74 with expansion of pipe 56 when water in the pipe freezes.

Figure 4:
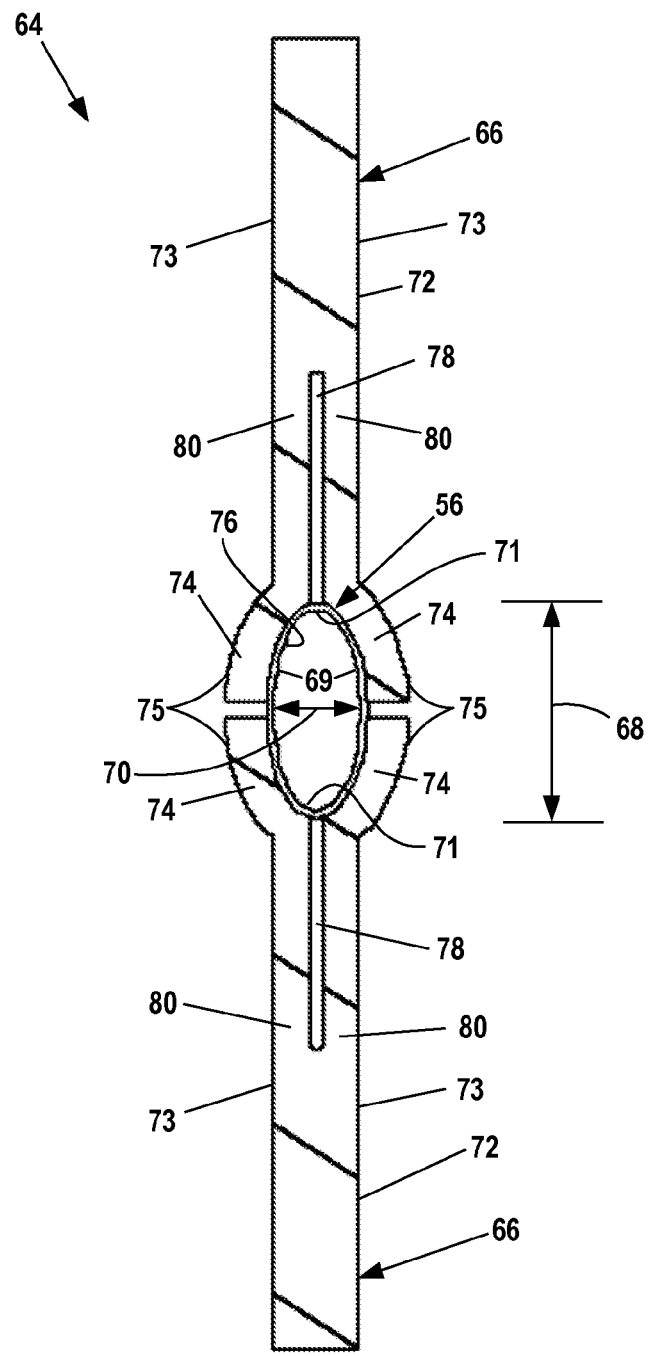
FIG. 4 is an enlarged sectional view of an absorber and water heating pipe shown in FIG. 3.

The spacing between arms 74 before mounting of plates 66 on the pipe 56 is slightly less than shown in FIG. 4 so that beams 80 are flexed outwardly slightly when the plates are mounted on the pipe and tight, surface-to-surface heat transfer connections are established between arms 74 and pipe 56. The connections promote efficient flow of solar heat from the plates to the pipe to heat water in the pipe.

If desired, a thin layer of flexible, thermally conductive material can be provided in the interface between surfaces 76 of arms 74 and the outer surface of pipe 56. The flexible, thermally conductive material may be silicon grease with thermally conductive particles. The material increases heat flow from the plates 66 to the pipe.

Water heating pipe 56 includes an inlet end 82 joined to pipe 20 and an outlet end 84 joined to pipe 22. The pipe 56 includes four straight heat-absorbing lengths 86 each extending along one of the four side-by-side semi-cylindrical mirrors 62 in assembly 12. The pipe also includes three semi-circular, 180-degree bends 88 between adjacent pipe lengths 86. Mirrors 62 may have a diameter of eight inches so that the radius of curvature of bends 88 is four inches.

Pipe 56 may be formed from a continuous length of elliptical stainless steel piping. Tooling is used to bend segments of the pipe about axes parallel to the pipe long axis 68 to form bends 88. Forming bends 88 by bending elliptical pipe around its long axis is easier than forming bends in a cylindrical pipe or bending elliptical pipe around an axis parallel to the short pipe axis.

Portions 28 and 30 of pipes 20 and 22 extend outside of the building and are exposed to temperatures which can form ice blockages in the PEX tubing. An ice blockage prevents flow of water through system 10 but does not injure the PEX tubing. Resistance heating wires 42 extend through the interiors of portions 28 and 30 of pipes 20 and 22 and are in direct contact with any ice blockage in the outdoor portions of the pipes. Heating of the resistance wires efficiently melts the ice blockage.

If desired, a resistance heating wire, or a number of resistance heating wires, may be mounted outside pipe portions 28 and 30. Flowing electricity through a wire or wires mounted on the outside of the portions heats each pipe and melts an ice blockage in the pipe.

The semi-cylindrical mirrors 62 have highly reflective inner surfaces. Sunlight received by the mirrors is reflected inwardly against the vertical absorber 64. The sides of absorber plates have heat-absorbing coatings to absorb heat from light reflected against the plates by the mirrors. Sunlight received by the mirrors is reflected against the absorber plates, independent of the angle at which the light strikes the mirrors.

Mirrors 62 need not be semi-cylindrical. The mirrors may have different shapes in order to reflect captured light onto plates 66.

The operation of solar heating system 10 will now be described.

Sunlight is reflected by mirrors 62 against both sides of absorbers 64 to heat plates 66. Heat from the plates flows to pipe 56 to heat water in the pipe. When the temperature in pipe 56, as determined by sensor 46, exceeds the temperature of the water in tank 14, as determined by sensor 44, by a predetermined difference, which may be 30 degrees F., the differential thermostat 40 sends a signal to control circuit 36 and the circuit actuates circulator pump 26. Pump 26 flows water from the bottom of tank 14 through the collector assembly 12 for solar heating and flows the heated water from the assembly into the top of the tank to heat the tank water. When the temperature of the water in the collector assembly no longer exceeds the temperature of the water in the tank by the predetermined difference, the control circuit 36 turns off circulator pump 26.

If the temperature outside the building wall 54 falls below freezing, water in the outside portions 28 and 30 of pipes 20 and may freeze, despite the fact that water in pipe 56 in collector assembly 12 is heated above freezing and may be warmer than water in tank 14. In this event, an ice blockage prevents solar heating of water in tank 14.

When water freezes to block pipe portion 28 or 30, pump 26 will run but water will not flow through pipe 20, pipe 56 and pipe 22. The absence of flow while pump 26 is running is detected by direct flow sensor 38 which sends a signal to circuit 36. Circuit 36 then flows electricity through power wires 48 and 52 to heat the resistance wires 42 in pipe portions 28 and 30. One of the wires 42 extends past the ice blockage. Heat from the wire 42 melts the ice blockage to reestablish flow of water through the pipe 56 by pump 26.

The resistance heating wires 42 are activated until sensor 38 detects reestablished flow of water, which may be slight at first. Once flow has been reestablished, a signal from flow sensor 38 actuates circuit 36 to deactivate the wires 42. Water is flowed past the remaining ice to rapidly melt the ice and reestablish normal operation of system 10, despite an outdoor temperature below freezing.

Flow sensor 38 detects decreased flow or no flow due to an ice blockage. The sensor may include a vane or a rotary turbine wheel located in supply pipe 20 and a detector responsive to movement of the vane or wheel. Other types of flow sensors may be used if desired including differential pressure flow sensors, ultrasonic flow sensors, calorimetric flow sensors, and the like.

Figure 6:
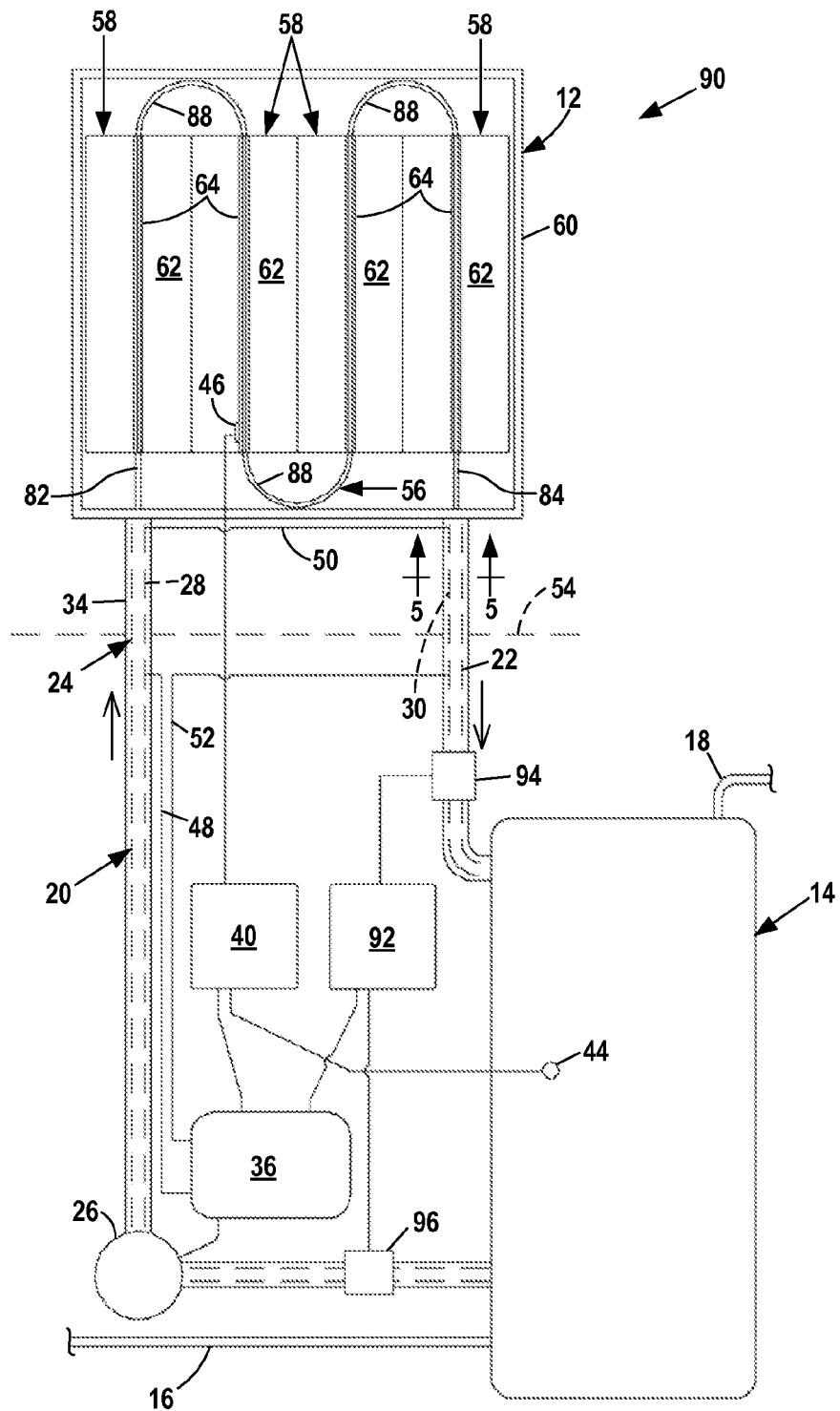
FIG. 6 is a representational view of a second embodiment solar heating system.

FIG. 6 illustrates a second embodiment solar heating system 90 which is like solar heating system 10. Reference numbers shown in FIG. 5, which are identical to reference numbers shown in FIG. 1, describe components of system 90 identical to the components of system 10. System 90 includes a solar collector assembly 12, water storage tank 14, water supply and return pipes 20 and 22, including insulated portions 28 and 30, pump 26 and differential thermostat 40, as previously described. Control circuit 36 is connected to the differential thermostat 40 and to pump 26.

System 90 includes a second differential thermostat 92 connected to temperature sensor 94 located in the return pipe 22 inside of exterior wall 54 and to temperature sensor 96 located in supply pipe 20 inside of exterior wall 54. System 90 does not use a flow sensor 38 and does not sense flow using moving parts.

During normal operation of solar heating system 90, pump 26 is actuated to circulate water through the solar collector 12 and flow the heated water back to tank 14, as previously described. Temperature sensor 94 detects decreased temperature in pipe 22 due to decreased flow and is an indirect flow sensor. If an ice blockage exists in portion 28 or 30 of pipe 20 or 22 the blockage will prevent flow of heated water from collector assembly 12 to tank 14. The temperature of the water in pipe 22 will not rise. When this condition exists the temperature difference between the water in pipe 22 will not greatly exceed that in pipe 20, as determined by sensors 94 and 96. When this difference is below a predetermined amount, which may be 20° F., differential thermostat 92 sends a signal to control circuit 36 to actuate the resistance heating wires 42 in the exterior portions 28 and 30 of pipes 20 and 22 to melt the ice blockage, as previously described.

Melting of the blockage and flow of heated water through pipe 22 which will raise the temperature of the water in the pipe. When the temperature of the water in pipe 22 exceeds the temperature of the water in pipe 20, as again determined by temperature sensors 94 and 96, by the predetermined amount, the differential thermostat 92 sends a signal to control circuit 36 to deactivate the resistance heating wires in pipe portions 28 and 30. Flow of water through the exterior portions 28 and 30 of pipes 20 and 22 melts any remaining ice in the blockage to reestablish normal operation of system 90.

FIG. 7 illustrates third embodiment solar heating system 98 having three series connected solar heating assemblies 100, 102 and 104 which replace the single assembly 12 used in the systems of FIGS. 1 and 6. The assemblies are each identical to solar collector assembly 12. The three collector assemblies are connected to water supply pipe 20 and water return pipe 22 of a solar heating system 10 or 98 located inside of building exterior wall 54. These alternative interior components are not illustrated in FIG. 7.

The outer insulated end 106 of pipe 20 extends from wall 54 to collector assembly 100 and is connected to the inlet end of water heating pipe 56 in assembly 100. Pipe end 106 is surrounded by insulation and a sheath, as previously described. The outlet end of water heating pipe 56 in assembly 100 is connected to an insulated pipe 108 extending from assembly 100 to assembly 102. Pipe 108 is connected to the inlet end of pipe 56 in assembly 102. The outlet end of pipe 56 in assembly 102 is likewise connected by insulated pipe 110 to the inlet end of the pipe 56 in assembly 104. The outlet end of pipe 56 in assembly 104 is connected to the insulated outer end 112 of pipe 22 which extends to wall 54. The control wiring 114 for temperature sensor 46 in assembly 104 extends through wall 54 to the differential thermostat 40 for system 98. Resistance heating wires (not illustrated) extend through outdoor pipes portions 106, 108, 110 and 112 and are connected to power wires 48 and 50. The resistance heating wires are actuated to melt ice blockages as previously described. Pipes 20, 56, 108, 110 and 22 form a single passage water conduit 99 extending from tank 14, through the assemblies 100, 102 and 104 and back to the tank.

The system 98 operates essentially like the systems 10 and 90. Pump 26 circulates water through the three solar collector assemblies 100, 102 and 104 and water is solar heated. The temperature sensor 46 determines the temperature of the water in assembly 104, which typically is higher than the temperatures of the water in assemblies 100 and 102. This temperature is used to determine whether the water returned through pipe 22 is sufficiently hot to heat the water in tank 14.

FIG. 8 illustrates a fourth embodiment solar heating system 118 which includes three parallel connected solar collector assemblies 120, 122 and 124. The assemblies are each identical to solar collector assembly 12. The three collector assemblies are connected to water supply pipe 20 and water return pipe 22 of system 10 or system 98 located inside building exterior wall 54. These components are not illustrated in FIG. 8.

Water supply pipe 20 extends outwardly of wall 54 and includes insulated outdoor supply branches 126, 128 and 130. The branches are connected respectively to the inlet ends of the water heating pipes 56 in the three assemblies. The outlet ends of the water heating pipes 56 in the assemblies are connected to insulated return branches 132, 134 and 136 of return pipe 22. All of the portions of the supply and return pipes located outwardly of wall 54 and connected to the three assemblies are surrounded by insulation and protective sheeting, as previously described. A single temperature sensor 46 is connected to a water heating pipe 56 in collector assembly 122. The sensor may be attached to the water heating pipe in any of the collector assemblies. Insulated resistance heating wires (not illustrated) are extended through the supply and return branches of pipes 20 and 22. When an ice blockage is sensed, the wires are actuated to melt the blockage, as previously described. Pipes 20, 56 and 22 form a plural passage water conduit 116 extending from tank 14, through assemblies 120, 122 and 124 and back to the tank.

During operation of system 118, pump 26 flows water from tank 14 through the three collector assemblies and flows the heated water directly back to the tank. The system 118 operates like system 10 or 98, as previously described.

Solar heating systems 98 and 118 use plural solar collector assemblies in order to increase the capacity and performance of the system. The use of a number of small individual solar collector assemblies facilitates manufacture, transportation and the mounting of the assemblies on the roof of a dwelling. Frequently smaller assemblies can be mounted advantageously where it is impossible to mount a large assembly having the same heating capacity.

Figure 2:
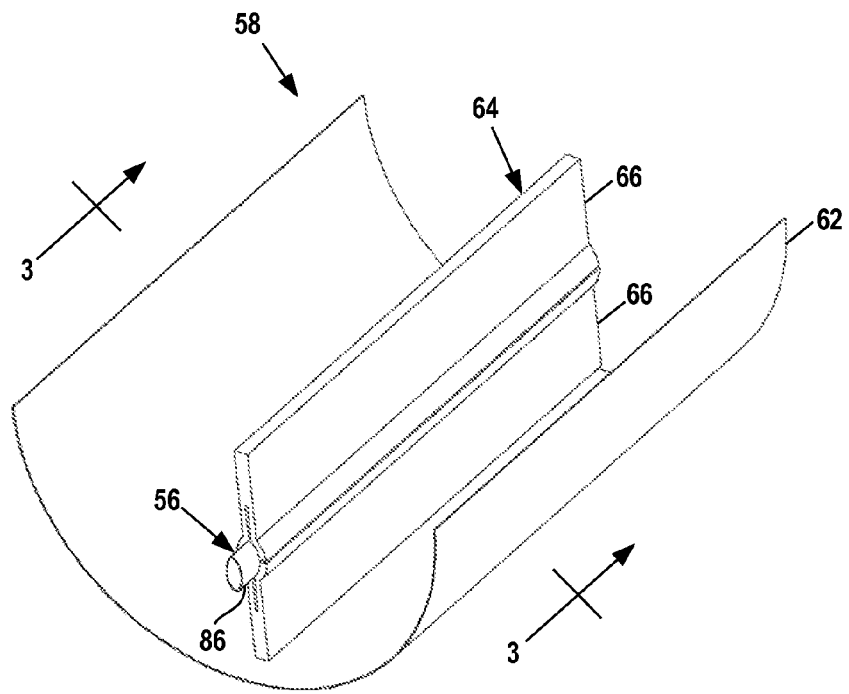
FIG. 2 is a perspective view of a first solar collector.
Figure 3:
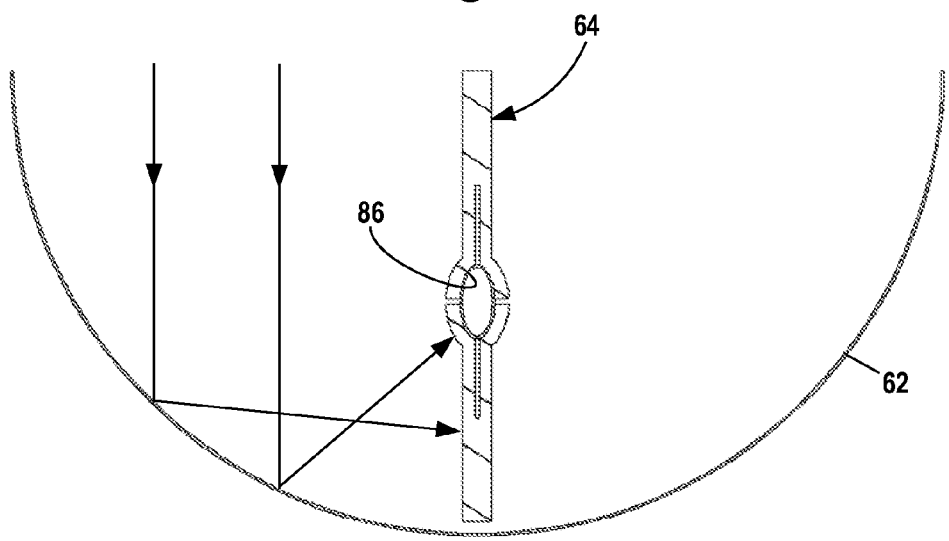
FIG. 3 is a sectional view taken along line 3--3 of FIG. 2.
Figure 9:
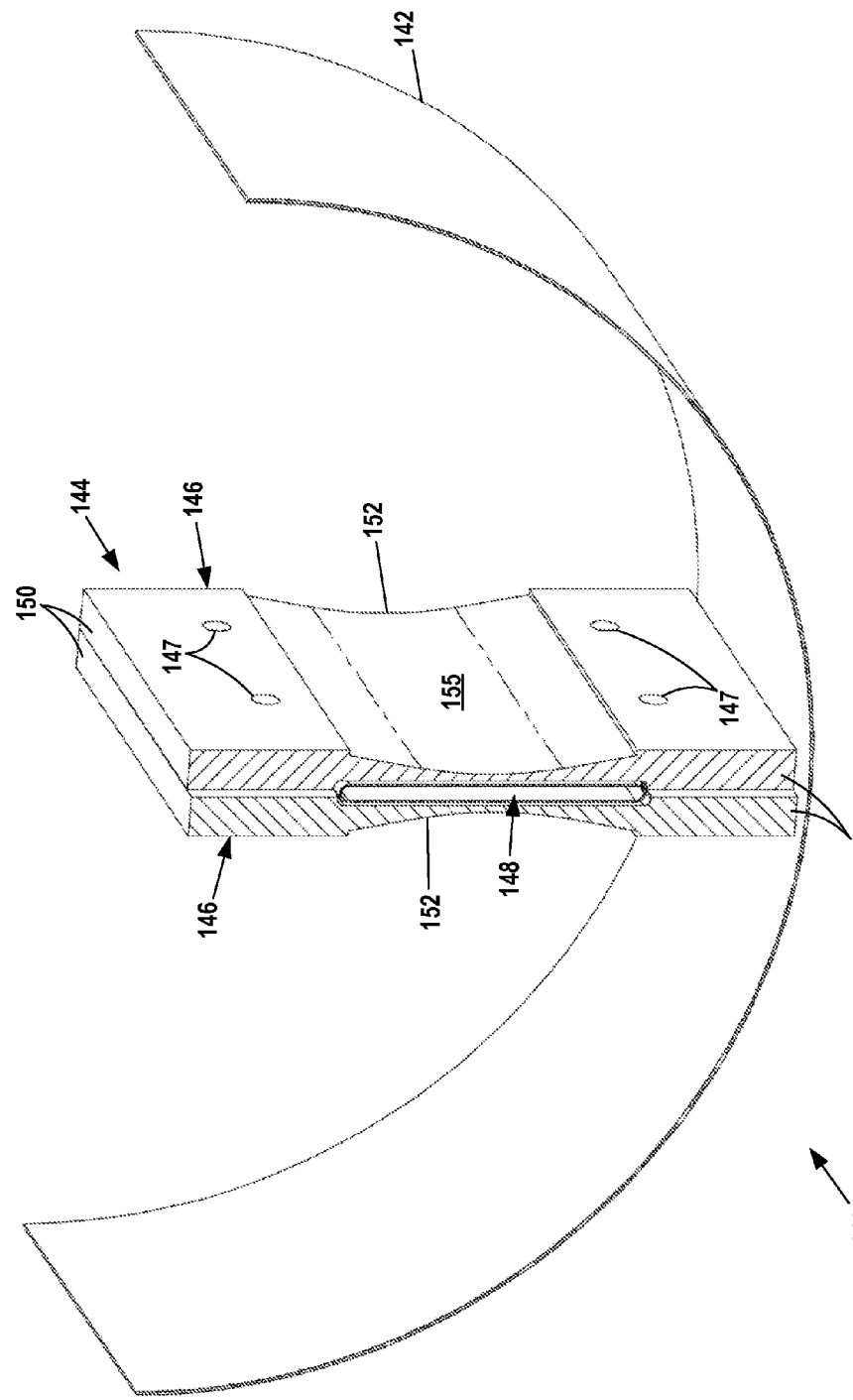
FIG. 9 is a transverse sectional view through a second solar collector.

FIGS. 9-11 illustrate a second solar collector 140 which may be used in the solar collector assemblies 12 of the previously described embodiments in place of previously described solar collector 58. Solar collector 140 includes an elongate semi-cylindrical mirror 142, like mirror 62, and a vertical solar absorber 144 located in the center of the mirror, in the same position as solar absorber 64 is positioned in mirror 62. Compare FIGS. 2 and 9.

Solar absorber 144 includes two like elongate absorber plates 146 and an elongate, flat water pipe 148 held between the plates. Each plate 146 includes elongate strips 150 at the top and bottom of the collector. Strips 150 have uniform thickness. The plates each include an elastically deformable pipe contact energy transfer portion 152 extending between the strips 150. Flat recesses 154 on the inner surfaces of portions 152 form a flat pocket 156 extending along the portions 152 between plates 146. Outer surfaces 155 of portions 152 are concave. The thickness of each energy transfer portion 152 decreases smoothly from a maximum thickness adjacent strips 150 to a minimum thickness at the centers of the strips. Plates 146 form from heat-absorbing metal which may be high thermal-conductivity aluminum. Plates 146 are secured together by threaded fasteners passing through holes 147 and spaced along strips 150. The fasteners may be formed from stainless steel and are preferably spaced from the aluminum in strips 150 by dielectric separators to prevent electrolytic corrosion.

Flat water pipe 148 has opposed wide and normally flat sidewalls 158 and opposed rounded and narrow sidewalls 160. The pipe is fitted in flat pocket 156 with sidewalls 158 abutting the flat pocket 154. Narrow, rounded sidewalls 160 are spaced inwardly from the top and bottom of flat pocket 156.

Water pipe 148 is preferably formed from the same metal as pipe 56, previously described. Likewise, the pipe sidewall may have a thickness of 0.020 inches to permit outward flexing of the flat sidewalls 158 when water in the pipe freezes. The pipe 148 may have a width of three inches and a spacing between the flat sidewalls of 0.150 inches. The long, closely spaced sidewalls 158 permit elastic outward expansion of the pipe when water freezes.

The pipe may be flattened slightly when the strips 150 are secured together in order to assure close surface-to-surface interfaces between the pipe and the plates. Rounded sidewalls 160 may be stressed. If desired, a thin layer of flexible, thermally conductive material may be provided in the interface between the pipe and the absorber plates, as previously described.

During normal operation of solar collector assembly 140, mirror 142 reflects solar energy onto absorber 144 and heat is transferred from the absorber plates 146 to water in pipe 148, as previously described.

In the event that water in pipe 148 freezes and expands, the increased pressure in the pipe forces the flat sidewalls 158 outwardly and flexes the portions 152 outwardly as shown in FIG. 11. Maximum deflection occurs at the centers of the portions, where the portions 152 are thinnest. Reduced deflection occurs to either side of the centers of the portions. During freezing, the portions 152 and pipe flat sidewalls 158 are bowed outwardly within their elastic limits and without permanent deformation. This means that when water in the pipe melts, the pressure in the pipe decreases and the pipe contact portions and flat pipe sidewalls return elastically to their original positions shown in FIG. 10. Freezing of water in the pipe does not injure the solar absorber or impair its efficiency in flowing solar energy to water in the pipe.

Although disclosed embodiments have been illustrated using water as the working fluid that may freeze, this is not intended to be limiting. The disclosed method is also applicable to fluid systems that utilize other, different working fluids (including without limitation fluids that have freezing points that are different than the freezing point of water). Other heater constructions or sources of energy for heating the heater may be used as is already known in the heating arts.

What I claim as my invention is:

1. A method for initiating the flow of fluid through a pipe of a solar heating system in which a portion of the pipe may be exposed to freezing temperatures such that fluid flow through the pipe potentially be blocked by frozen fluid in the said pipe portion, the pipe portion having a length dimension, the method comprising the steps of:
    (a) urging the flow of fluid through the pipe; and
    (b) while urging the flow of fluid through the pipe, performing the following steps:
    (c) detecting the absence or presence of fluid flow through the pipe;
    (d) when no fluid flow is detected, actuating an electric resistance heater disposed in the pipe portion and extending the length of the pipe portion, thereby transferring heat from the heater to any frozen fluid blocking the pipe portion sufficient to initiate melting of a flow passage through the blockage;
    (e) detecting the absence or presence of fluid flow through the pipe while the heater is transferring heat; and
    (f) when fluid flow through the pipe is detected, stopping the heating of the heater.

2. The method of claim 1 wherein detecting the absence or presence of fluid flow through the pipe comprises the step of:
    (g) monitoring a flow sensor configured to sense fluid flow.

3. The method of claim 1 wherein detecting the absence or presence of fluid flow through the pipe comprises the steps of:
    (g) measuring a first temperature related to the temperature of the fluid in the pipe at a first location along the pipe;
    (h) measuring a second temperature related to the temperature of the fluid in the pipe at a second location along the pipe spaced from the first location; and
    (i) computing the temperature difference between the first and second temperatures.

4. The method of claim 3 wherein an absence of fluid flow is indicated if the temperature difference calculated in step (i) is less than a predetermined temperature difference.

5. The method of claim 3 wherein step (i) is performed by a differential thermometer.

6. The method of claim 1 wherein the heater comprises a wire, and the step of heating the heater comprises passing an electric current through the wire.

7. The method of claim 6 wherein the pipe portion comprises a plurality of pipe portions spaced apart from one another, each pipe portion having a respective length dimension, and the heater comprises a plurality of wires, each wire of the plurality of wires disposed in a respective pipe portion and extending the respective length of such pipe portion, and the step of passing an electric current through the wire comprises the step of passing an electric current through each wire of the plurality of wires.

8. The method of claim 1 wherein step (a) comprises the step of:
    (g) energizing a pump fluidly connected to the pipe.

9. The method of claim 1 comprising the steps of:
    (g) periodically stopping and then resuming fluid flow through the pipe; and
    (h) performing steps (a) and (b) each time fluid flow is to be resumed after a flow stoppage.

10. The method of claim wherein the pipe portion extends in a straight line along the length dimension.

11. The method of claim 1 wherein the step of heating the heater comprises flowing steam through the heater.

12. The method of claim 1 wherein step (b) further comprises the steps of:
    (g) repeatedly transmitting a first signal representing whether or not there is fluid flow through the pipe to a controller operatively connected to the heater; and
    (h) if the first signal represents there is no fluid flow through the pipe, transmitting a second signal from the controller to the heater energizing the heater; and
    (i) if the first signal represents there is fluid flow through the pipe and the heater is energized, transmitting a third signal from the controller to the heater turning off the heater.

13. A method for initiating the flow of fluid through a solar water heating system of the type having a solar collector assembly that heats water by solar energy and a pipe system supplying water to the solar collector assembly and discharging water from the solar collector assembly, the pipe system comprising a pipe portion that exposed to freezing temperatures whereby ice formed in the pipe portion from such exposure may block the flow of water through the pipe portion, the pipe portion having a length dimension, the method comprising the steps of:
    (a) urging the flow of fluid through the pipe portion; and
    (b) while urging the flow of fluid through the pipe portion, performing the following steps:
    (c) detecting the absence or presence of fluid flow through the pipe portion;
    (d) when no fluid flow is detected, actuating an electric resistance wire disposed in the pipe portion, the wire extending the length of the pipe portion and thereby transferring heat from the heated wire to any ice blockage in the pipe portion sufficient to initiate melting of a flow passage that flows water through the ice blockage;

(e) detecting the absence or presence of fluid flow through the pipe portion while heating the wire; and (f) when fluid flow through the pipe portion is detected, stopping the heating of the wire.

14. The method of claim 13 wherein the solar collector assembly and the pipe system together define a closed fluid loop, and detecting the absence or presence of fluid flow through the pipe portion comprises the step of:

(g) detecting the absence or presence of fluid flow at a point along the fluid loop remote from the pipe portion.

15. The method of claim 13 wherein detecting the absence or presence of fluid flow through the pipe portion comprises the step of:

(h) monitoring a flow sensor connected to the solar water heating system away from the pipe portion and positioned to sense fluid flow in the system at the flow sensor's location.

16. The method of claim 13 wherein detecting the absence or presence of fluid flow through the pipe portion comprises the step of:

(g) measuring a first temperature related to the temperature of the water at a first location along the pipe system away from the pipe portion;

(h) measuring a second temperature related to the temperature of the water in the pipe system at a second location along the pipe system away from the pipe portion and away from the first location; and (i) computing the temperature difference between the first and second temperatures.

17. The method of claim 16 wherein the solar water heating system comprises a tank configured to hold water and the piping system comprises a first pipe extending from the solar collector assembly to the tank and a second pipe extending from the tank to the solar collector assembly, and wherein:

the first location along the pipe system is located along the first pipe; and the second location along the pipe system is located along the second pipe.

18. The method of claim 16 wherein step (i) is performed by a differential thermometer.

19. The method of claim 13 wherein heating the wire comprises flowing an electric current through the wire.

20. The method of claim 19 wherein the pipe portion comprises a plurality of respective pipe portions spaced apart from one another, and step (d) comprises the step of simultaneously passing an electric current through a plurality of wires, each wire disposed in a respective pipe portion.

21. The method of claim 13 wherein the solar hot water system comprises a pump fluidly connected to the pipe portion and step (a) comprises the step of:

(g) energizing the pump.

22. The method of claim 21 wherein the solar hot water system comprises a controller connected to the pump, the controller configured to energize the pump in response to a demand for heated water to be supplied from the solar collector assembly and de-energize the pump when the demand is met, the method further comprising:

(h) performing steps (a) and (b) each time the controller receives a demand for heated water.

\* \* \* \* \*